United States Patent
Barde (10) Patent No.: US 9,286,080 B2
(45) Date of Patent: Mar. 15, 2016

(54) MEMORY MANAGEMENT FOR HYPERVISOR LOADING

(75) Inventor: Kaushik C. Barde, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2283 days.

(21) Appl. No.: 12/217,240

(22) Filed: Jul. 2, 2008

(65) Prior Publication Data

US 2010/0005267 A1   Jan. 7, 2010

(51) Int. Cl.
*G06F 12/02* (2006.01)
*G06F 9/44* (2006.01)
*G06F 9/455* (2006.01)

(52) U.S. Cl.
CPC ............ *G06F 9/441* (2013.01); *G06F 9/45558* (2013.01); *G06F 2009/45583* (2013.01); *G06F 2009/45587* (2013.01)

(58) Field of Classification Search
CPC ................ G06F 9/441; G06F 9/45558; G06F 2009/45583; G06F 2009/45587
See application file for complete search history.

(56) References Cited

U.S. PATENT DOCUMENTS

| | | | |
|---|---|---|---|
| 4,300,192 A * | 11/1981 | Couleur et al. | 711/153 |
| 5,951,685 A | 9/1999 | Stancil | |
| 6,397,242 B1 | 5/2002 | Devine et al. | |
| 6,694,346 B1 * | 2/2004 | Aman et al. | 718/104 |
| 6,892,383 B1 | 5/2005 | Arndt | |
| 6,915,402 B2 * | 7/2005 | Wilson et al. | 711/173 |
| 7,003,771 B1 | 2/2006 | Arndt | |
| 7,082,509 B2 | 7/2006 | Zimmer et al. | |
| 7,318,148 B2 | 1/2008 | Scheibli | |
| 7,325,163 B2 | 1/2008 | Kondajeri et al. | |
| 7,366,887 B2 | 4/2008 | Waltermann et al. | |
| 7,370,186 B1 | 5/2008 | Lilliebjerg | |
| 7,380,119 B2 | 5/2008 | Bade et al. | |
| 7,380,136 B2 | 5/2008 | Zimmer et al. | |
| 7,822,979 B2 * | 10/2010 | Mittal | 713/164 |
| 2004/0105298 A1 * | 6/2004 | Symes | 365/149 |
| 2004/0153672 A1 * | 8/2004 | Watt et al. | 713/201 |
| 2004/0177342 A1 * | 9/2004 | Worley, Jr. | 717/121 |
| 2004/0243783 A1 * | 12/2004 | Ding et al. | 711/170 |
| 2005/0060590 A1 * | 3/2005 | Bradley et al. | 713/320 |
| 2005/0210467 A1 * | 9/2005 | Zimmer et al. | 718/1 |
| 2006/0040642 A1 * | 2/2006 | Boris et al. | 455/407 |
| 2006/0101224 A1 * | 5/2006 | Shah et al. | 711/173 |
| 2006/0236122 A1 | 10/2006 | Field | |
| 2006/0294519 A1 | 12/2006 | Hattori | |
| 2010/0031270 A1 * | 2/2010 | Wu et al. | 718/107 |
| 2010/0050174 A1 * | 2/2010 | Zhou et al. | 718/1 |

FOREIGN PATENT DOCUMENTS

| CN | 1487424 A | 4/2007 |
|---|---|---|
| CN | 101038556 A | 9/2007 |

(Continued)

OTHER PUBLICATIONS

VMware, The Role of Memory in VMware ESX Server 3, Sep. 2006.*

(Continued)

*Primary Examiner* — Matthew Bradley
*Assistant Examiner* — Ramon A Mercado
(74) *Attorney, Agent, or Firm* — Trop, Pruner & Hu (57) ABSTRACT

Techniques related to personal computers and devices sharing similar architectures are disclosed. Particularly shown is a system and method for enabling improved performance and security in hypervisor programs and related applications programs achieved through the use of multiple non-volatile memories.

10 Claims, 6 Drawing Sheets

(56) References Cited

FOREIGN PATENT DOCUMENTS

| | | |
|---|---|---|
| JP | 11-282685 | 10/1999 |
| JP | 1999-282685 | 10/1999 |
| JP | 2001-236237 | 8/2001 |
| JP | 2001-256066 | 9/2001 |
| JP | 2002-140229 | 5/2002 |
| JP | 2004-103009 | 4/2004 |
| JP | 2007-035010 | 2/2007 |
| JP | 2008-108260 | 5/2008 |
| TW | 5445476 B | 8/2003 |
| TW | 200540711 | 12/2005 |
| WO | WO-2008073618 | 6/2008 |

OTHER PUBLICATIONS

International Searching Authority, International Search Report and Written Opinion, Appln No. PCT/IB2009/052750, date of mailing Jul. 9, 2009, pp. 15.

Nadathur A.: "Phoenix HyperSpace—Transforming the personal computing experience", Internet Article, [Online], Dec. 4, 2007, pp. 1-2, XP002543127, Retrieved from the Internet.

Perilli A: "BIOS leader Phoenix working on its own hypervisor", Internet Article, [Online] Oct. 24, 2007, pp. 1-2, XP002543246, Retrieved from the Internet.

Perilli A: "Phoenix to unveil its virtualization strategy in February", Internet Artlcle. [Online]Jan. 21, 2008, pp. 1-2,XP002543128,Retrieved from the Internet.

European Patent Office, Communication pursuant to Article 94(3) EPC, Appln No. 09772973.5, date of mailing Jun. 29, 2011, 5 p.

"BIOS leader Phoenix working on its own hypervisor"; http://virtualization.info/en/news/2007/10/bios-leader-phoenix-working-on-its-own.html, Oct. 27, 2007.

"PhoenixHyperSpace: Transforming the personal computing experience", 2007.

European Patent Office, Communication pursuant to Article 94(3) EPC, Appln No. 09772973.5, date of mailing Jan. 23, 2012, 7 p.

* cited by examiner

MEMORY MANAGEMENT FOR HYPERVISOR LOADING

RELATED APPLICATIONS

No related applications.

FIELD OF THE INVENTION

The present invention generally relates to personal computers and devices sharing similar architectures. The invention more particularly relates to a system and method for enabling improved performance and security in hypervisor programs and related applications programs.

BACKGROUND OF THE INVENTION

Modernly, usage of PCs (personal computers) is quite commonplace, yet still growing. Affordable hardware becomes faster and has more capabilities and capacities with each passing year. Application software to handle new tasks and system software to handle new devices continues to emerge.

A typical user may encounter new versions of software that is already deployed with both advantages and disadvantages as compared with the old. It is fair to say that as time passes a typical user deploys a computer of ever more capabilities and increasing amounts of software.

A perennial problem facing the typical computer user is the benefits (and financial cost) of adopting a new version of hardware or software (or a new application entirely) versus the benefit of staying with older product that one has learned to work well with. The factors that go into such a choice are complex (and beyond the present scope) but integrated software solutions raise additional concerns as they tend to limit the ability of different applications (or even different variants of the same application) to peacefully coexist. A common problem of this type might arise if one has, for example, a device driver for particular hardware designed to work only with Microsoft® Windows® XP™ OS (Operating System) and an application program designed to work only with Microsoft® Windows® Vista OS. No solution is entirely satisfactory and tradeoffs will have to be tolerated.

Another significant consideration for a typical user is the computer start-up time. In general the more always-resident software is tolerated the longer the computer will take to come from power-on to a ready for use condition. Even where multiple software, especially multiple OS, are inter-operable and useful (or at least peaceably co-exist) and provide sufficient performance they may still take too long to initialize and come to a ready state as compared with using a single OS. Computer start-up time can easily become irritating to a user who merely wishes to get on with the task at hand.

A further and growing problem is malware. Various improvements that target malware have been proposed but they too often rely on integrated solutions tied to a specific vendor, or worse, tied to a particular version of software from a particular vendor. This can make managing multiple software variants even more difficult. Moreover, such solutions can too often use an approach of "security by obscurity" which gives the user reduced control of his or her destiny and which is less suitable for use with open source products.

SUMMARY OF THE INVENTION

Accordingly, the invention provides method for initializing a computer for support of virtual machines. Other electronic devices which may include computers or totally different digital controllers may also be used.

Inventive methods may include allocating memory regions and loading programs from non-volatile memories there into. Such programs may include a hypervisor program, a program to load hypervisors, and Appliance programs. Also memory heaps may be created for various purposes and non-volatile memories such as disk drives may be processed such as for loading Operating Systems.

Several variants of these aspects are also discussed together with alternative exemplary embodiments. The disclosed improved designs for firmware and/or software enable superior tradeoffs in regards to the problems outlined above, and more.

DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which.

For convenience in description, identical components have been given the same reference numbers in the various drawings.

DETAILED DESCRIPTION OF THE PREFERRED EMBODIMENTS

In the following description, for purposes of clarity and conciseness of the description, not all of the numerous components shown in the schematics and/or drawings may be described. The numerous components are shown in the drawings to provide a person of ordinary skill in the art a thorough, enabling disclosure of the present invention. The operation of many of the components would be understood and apparent to one skilled in the art.

The description of well known components is not included within this description so as not to obscure the disclosure or take away or otherwise reduce the novelty of the present invention and the main benefits provided thereby.

An exemplary embodiment of the present invention will now be described with reference to FIG. 1.

Figure 1:
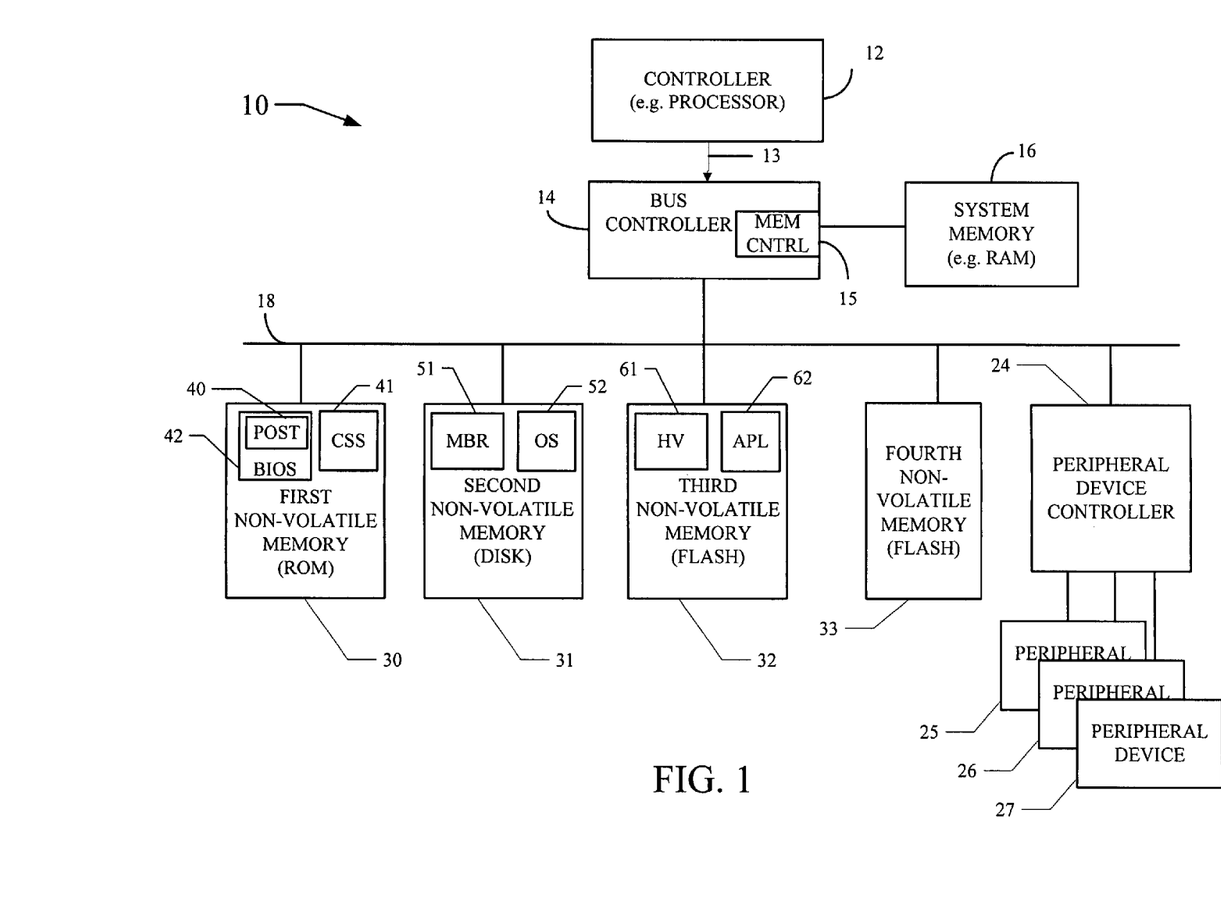
FIG. 1 is a schematic block diagram of an electronic device configured to implement a computer program product and/or method for initializing a computer according to an embodiment of the present invention.

FIG. 1 is a schematic block diagram of an electronic device implementing the memory usage functionality according to the present invention. In an exemplary embodiment, the electronic device 10 is implemented as a personal computer, for example, a desktop computer, a laptop computer, a tablet PC or other suitable computing device.

Although the description outlines the operation of a personal computer, it will be appreciated by those of ordinary skill in the art, that the electronic device 10 may be implemented as a PDA, wireless communication device, for example, a cellular telephone, embedded controllers or devices, for example, set top boxes, printing devices or other suitable devices or combination thereof and suitable for operating or interoperating with the invention.

The personal computer 10 may include at least one controller or processor 12, configured to control the overall operation of the electronic device 10. Such a processor or controller is often termed a CPU (Central Processing Unit) or an MPU (Microprocessor Unit). The processor 12 may include an ALU (arithmetic/logic unit) for performing computations, one or more registers for temporary storage of data and instructions, and a sequencer or controller for controlling the operations of the personal computer 10. In one embodiment, the processor 12 may include any of the Celeron® and Centrino™ microprocessors manufactured by Intel® Corporation, or the Power-PC® processor marketed by International Business Machines®. In addition, any of a variety of other processors, including those from Sun Microsystems®, MIPS®, NEC®, Cyrix® and others may be used for implementing the processor 12. The processor 12 is not limited to microprocessors, but may take on other forms such as microcontrollers, digital signal processors, dedicated hardware e.g. ASIC (application-specific integrated circuit), state machines or software executing on one or more processors distributed across a network.

The processor 12 may be coupled to a bus controller 14 by way of a CPU bus 13. The bus controller 14 may include a memory controller 15 integrated therein. In an alternate embodiment, the memory controller 15 may be separate from the bus controller 14. The memory controller 15 may provide an interface for access by the processor 12 or other devices to read-write system memory 16, for example RAM (random access memory).

The bus controller 14 may be coupled to a system bus 18, for example a PCI (peripheral component interconnect bus). Coupled to the system bus 18 may be a peripheral device controller 24 also known as an input/output controller. In turn peripheral device controller 24 is coupled to various other devices 25, 26, 27 such as keyboard, mouse, printer or etc. Other components (not shown in FIG. 1) are likely to be present, for example a display controller coupled to a display and a network communications controller would be commonplace.

The system bus 18 may also be coupled to a number of non-volatile memories 30, 31, 32, 33. FIG. 1 shows four non-volatile memories by way of example, in practice there may be fewer or more non-volatile memories. In other embodiments, memories may be coupled in other ways, for example directly coupled to the bus controller 14.

As indicated in FIG. 1, the exemplary non-volatile memories 30, 31, 32, 33 may be of various technologies and respective capabilities. As shown in FIG. 1, non-volatile memory 30 may be implemented as ROM (Read-only memory) and may have recorded therein a POST (Power-On Self-Test) 40 and a CSS (core system software) 41 as well as other components such DDs (Device Drivers).

Still referring to FIG. 1, a further non-volatile memory, 31 may be implemented as a disk controller with integral disk drive mechanism 31. A disk-based non-volatile memory may typically contain an MBR (Master Boot Record) 51, and OS (Operating System software) 52 and much more, including both programs and data.

Referring again to FIG. 1, third and fourth non-volatile memories 32, 33 may contain various components. Typically, one of the non-volatile memories may be implemented as a Flash memory or SDM (Secure Digital Memory) and is used to store system configuration information that is used primarily by the POST which may typically be comprised within a BIOS (Basis Input-Output System firmware) 42. Flash memory is usually embodied as a block oriented type of EEPROM (Electrically Erasable Programmable Read-Only Memory).

Other software components for example Hyperspace™ from Phoenix Technologies® Ltd. may be stored in any of the non-volatile memories, for example the third non-volatile memory 32 may contain a copy of a Hypervisor program 61 (also known as a VMM (virtual machine monitor)) and/or relatively small applications programs termed Appliances 62 (or Applets).

Although firmware and software may be stored in non-volatile memories, it is commonly transferred to system memory 16 prior to execution by means of a block-oriented device driver or by a shadow-memory technique as is well-known in the art. Exceptionally, instructions, especially POST instructions used for early computer setup may be executed directly out of ROM or etc., such as instructions used to implement the shadow-memory operation itself.

Figure 2:
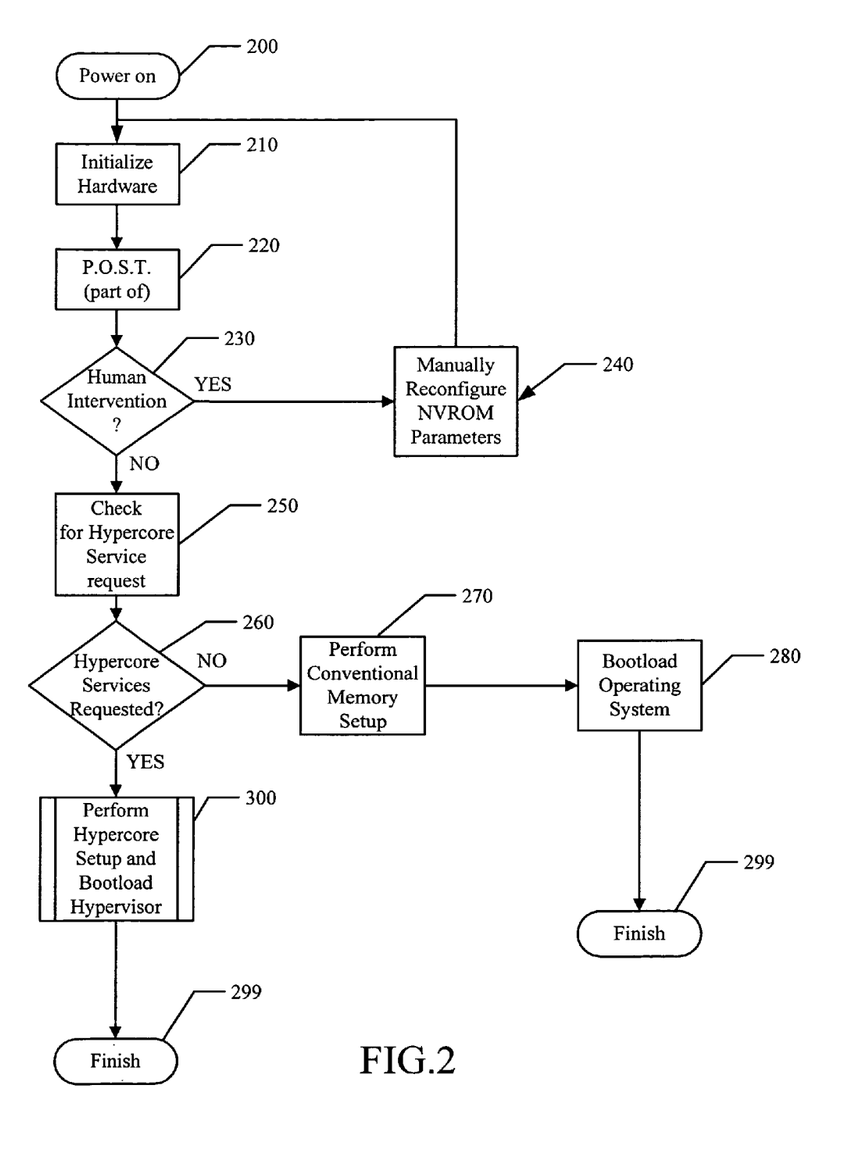
FIG. 2 is a flow chart illustrating the steps performed by the electronic device when implementing an embodiment of the invention.

In combination, and many permutations, the non-volatile memories of FIG. 1 may contain instructions (firmware and software) for carrying out the steps or acts described below with reference to other figures FIG. 2 is a flowchart illustrating the steps performed by the electronic device when implementing an embodiment of the invention beginning from a power-on condition 200. FIG. 2 is purely exemplary and many alternative embodiments are possible within the general scope of the invention. Moreover, FIG. 2 is quite high-level and further detail is described below with reference to other figures.

In step 210, the hardware is initialized as an early act in bringing up the hardware so that other capabilities may be reached. Then follows the beginning of POST (Power-on self-test) 220 which has many features not shown in FIG. 2.

At some point in the POST process, an opportunity 230 exists for human intervention 240 to permit manual reconfiguration of non-volatile memory parameters such as mini SDM (mini Secure Digital Memory). Typically this is followed by a return to the beginning of a power-up initialization sequence 210.

In step 250, a check is made as to whether Hypervisor services such as Phoenix Technologies® Ltd. Hypercore™ are requested. Such request may be a boot-time service, such as may be responsive to a BIOS configuration parameter. The determination thus made (step 260), if Hypervisor services are not being requested, then at step 270 a conventional memory setup is performed, at step 280 such as to an OS (operating system) is boot-loaded and at step 299 control is ceded from the BIOS (in this example to the OS).

In step 300, Hypervisor services have been requested and the responsive Hypercore setup and Hypervisor bootload are discussed below with reference to FIG. 3. After which setup is completed 299.

Figure 3:
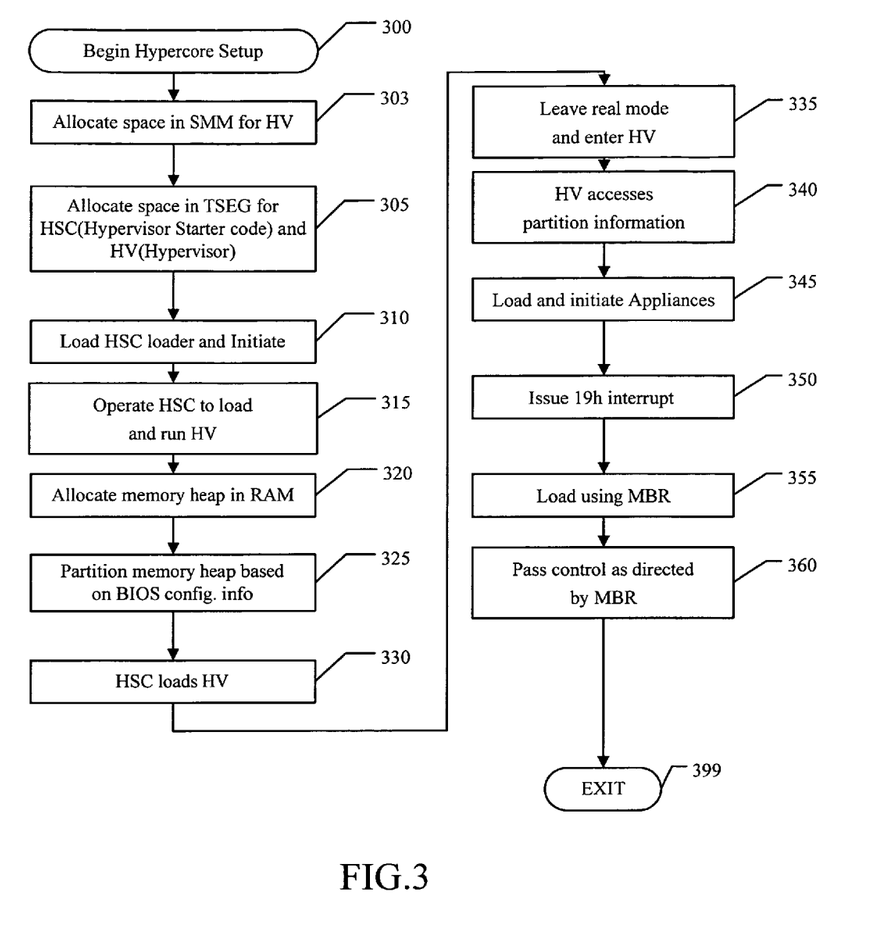
FIG. 3 is a flow chart illustrating the steps performed when implementing the loading and running of a hypervisor, appliances and main operating system in an exemplary embodiment of the invention.

FIG. 3 shows Hypercore setup with Hypervisor bootload and associated acts in accordance with an embodiment of the invention and beginning 300 with the start of Hypercore setup. Typically, in this phase of execution the instruction codes are part of BIOS or other firmware and may be shadowed in memory.

In step 303, space is allocated in a SMM (System Management Memory) partition for HV (Hypervisor) security data. SMM memory is accessed in a temporally lesser used CPU mode—System Management Mode which is intended for low-level services such as CPU temperature monitoring.

Next, in step 305, space is allocated for a HV (Hypervisor) for example the PVMM (Phoenix Virtual Machine Monitor) from free memory. In the example shown this allocation may be from the TSEG (Top of Memory Segment) RAM space. This newly allocated space can be known as the PVMMS (Phoenix Virtual Machine Monitor segment).

In step 310 a HSC (Hypervisor Starter Code) is loaded from a non-volatile memory, for example Flash memory, to the PVMMS. Software relocation techniques are well-known in the art to include applying adjusted base addresses to offsets and similar techniques to make code independent of absolute memory addresses. In an embodiment the HSC executes mostly in Big Real Mode (also known as Unreal or Flat Real Mode) in Intel® X86 and similar little-endian CPU architectures.

Relocation of code is also known as Loading in some implementations, especially in environments in which Unix® argot is favored. Strictly, Loading is a little broader than Relocation in that it does not necessarily include address adjustments—even though such adjustments are made in a high proportion of cases.

In an embodiment the HSC may then operate (step 315) to load the HV (Hypervisor) program. Sometimes an HV is not loaded directly but instead a Loader is loaded which operates to load the HV such as in a cascade loading arrangement.

HV programs are common in the art, they are used to create and host VM (Virtual Machine) environments in which programs that are substantially capable of running "naked" (i.e. without a HV) in the computer are hosted by the HV. VMs are well-known as a mechanism to prevent visibility between instances of VMs so that programs which run in VMs have no "awareness" of (visibility of the fact that) they are not alone in the computer among similar peer programs.

Though not shown in FIG. 3, control may then return from the HSC to a BIOS thread wherein system memory (RAM) for further space needs is allocated, for example space for ACPI (Advanced Configuration and Power Interface).

Typically, a late action of BIOS code is to set up (FIG. 3, step 320) the "memory heap" also known as the "free store". The heap tends to consist of substantially all the free store (usually RAM) that is available for use by operating systems and by the programs they load. In computer science, dynamic memory allocation is the allocation of memory storage for use in a computer program during the runtime of that program. It can be seen also as a way of distributing ownership of limited memory resources among many pieces of data and code. In an embodiment of the present invention, the heap expressly excludes the memory dedicated to the HV, this acts to eliminate (or substantially reduce) visibility of the HV as seen from later loaded programs, especially from general purpose operating systems such as Microsoft® Windows® or Linux®.

In an embodiment, after setting up the heap the BIOS will transfer control back to the HSC which will then load and initiate the protected and/or virtual memory modes of the HV. Typically, HV and/or BIOS acting together will read parametric steering information out of the memory used for BIOS configuration (or some other well-hidden non-volatile memory) which information may be used to partition the heap (Step 325) into memory dedicated to the multiple VMs. Thus the information to guide steering is made available to the HSC or HV, either directly or through their respective Loaders.

Still referring to FIG. 3, in step 330, the hypervisor program is loaded; typically it may be loaded by the HSC. In other embodiments the hypervisor may be loaded before allocating and/or partitioning the memory heap (steps 320, 325). In an implementation, the HSC may run in CPU Big Real Mode but the HV may run largely or entirely in a more commonplace CPU mode such as Protected or Virtual Memory mode. The steps 335 of leaving Real mode when entering the HV is largely implementation specific.

Thus being able, in step 340, to use memory heap partition information for the VMs, the HV may proceed to continue setting up the VMs. In step 345, small applications programs known as Appliances or Applets may be loaded from a non-volatile memory set aside for that purpose or otherwise separate and protected from the main non-volatile memory which is typically a hard disk drive.

Of course the programs loaded by the HV typically may, if they so desire, treat their memory allocation as its own heap and may partition it further among various applications, device drivers etc.

At this point the HV may follow the path of a non-HV CPU bootload procedure, for example, in Step 350 it may issue a 19h interrupt. The 19h interrupt is the "caught" by code which (step 355) may load the MBR from the main non-volatile memory (typically hard disk) and pass control (step 360) to a program found using the MBR (and which may for example a be boot-loader contained within the MBR or it may be a program for which the MBR contains some form of indirection information (e.g. "disk pointer")). At step 399 this completes the acts of allocating space for, loading and running the HSC and HV and the appliances and/or main OS programs hosted by the HV.

Of course most HVs do far more than described here, as is well known in the art including virtualization of I-O (Input-Output) requests (whether addressed to hardware or to device drivers) and paravirtualization of other system requests. For example, in x86 architectures, an HV may hook Interrupt 15h so that it may virtualize the well-known "Int.15h/EAX=E820h" memory requests so that an OS has visibility to its own partition of the heap and not visibility to the entire heap. The BIOS would typically provide visibility to the entire heap and the HV may act to prevent this visibility (except for requests which originate in the HV itself (or at least not from within code loaded by the HV nor code resident in the heap).

Thus, once it has control, the HV may retain control of computer until the next system reset, often responsive to intervention by SMM (system management mode) control (which is typically used for major events such as overheating detection or incipient system shutdown).

Figure 4:
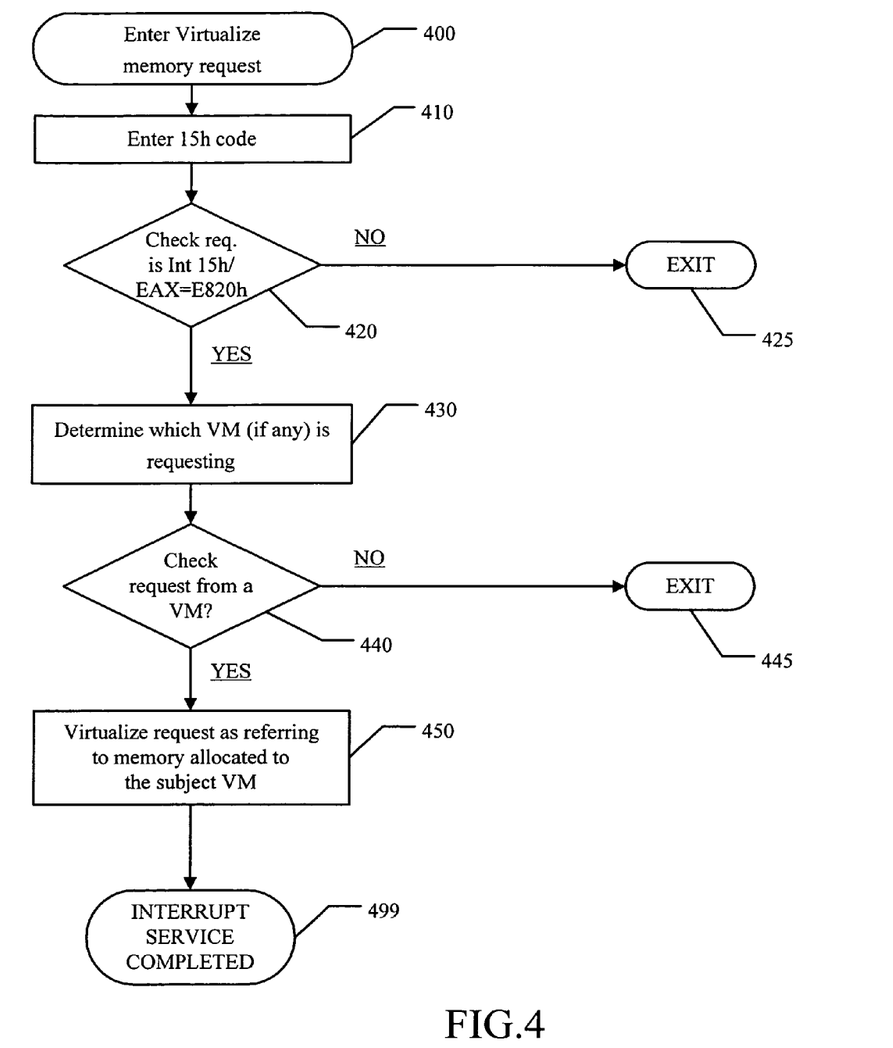
FIG. 4 is a flow chart illustrating the steps performed when virtualizing memory informational requests from a VM (virtual machine) in an exemplary embodiment of the invention.

FIG. 4 shows an example of virtualization performed by a HV that uses the invention. At step 400, entry is made into a service function responsive to a memory request, which request is to be virtualized by the HV. Such a memory request is typically embodied as an ISR (Interrupt Service Routine) for an Int 15h software interrupt (step 410).

In step 420 a check is made as to whether the request is a memory informational of the particular format supported (Int=15h/EAX=E820h) many of which formats are well-known in the art. If the interrupt request is of some other kind then at 425 control is exited to a next ISR in the chain.

Assuming then that the request is to be serviced then in step 430 a determination is made as to which VM is requesting memory information. If the request is not from a VM at all (step 440) then the request is not virtualized but, at step 445, is merely passed along to action by another ISR in the chain (if any).

In step 450 a response is compiled to the Int=15h/EAX=E820h request but virtualized for the specific VM. In effect that VM's memory partition is treated as though it were the entire heap for the purpose of compiling virtualized responses to memory requests. At step 499, this completes the ISR to service virtual machine memory requests.

Figure 5:
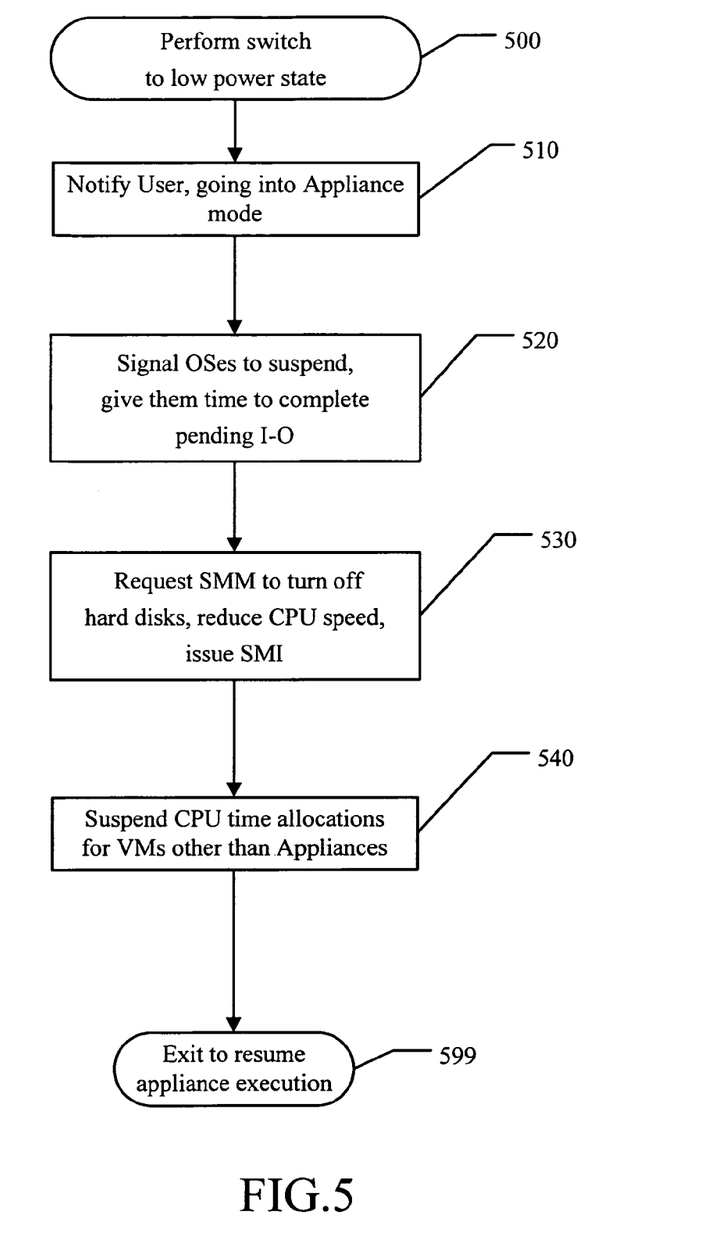
FIG. 5 is a flow chart illustrating the steps performed when switching to a reduced-facilities mode in an exemplary embodiment of the invention.

Turning now to FIG. 5, this describes action of the HV when performing Hypercore services associated with run-time transition to a reduced-facilities, streamlined form of operation. This capability is complementary to and largely enabled by the facilities described above with reference to the other figures.

An exemplary embodiment of the invention could use a reduced-facilities mode wherein the primary OS loaded via the MBR is suspended/disabled and the associated (energy hungry) hard disk is placed in a power-down state, but yet the Appliance programs run on using semiconductor non-volatile memory. However the use of a reduced facilities state with low-power operation is but an example, the two aspects are potentially quite separable one from the other.

In step 500 of FIG. 5, entry is made into the process for switching to low-power state operation. In step 510, the computer user is notified that the computer is going into Appliance mode, probably in acknowledgement of a stimulus requesting to do so.

Then in step 520 the OS(es) loaded into VMs are sent signals to warn them to wrap up operations which may include completion of pending I-O (Input-Output) operations. Typically OSes have hooks for the purpose, in connection with machines going into "Sleep State" or similar according to hardware and/or software implementation choices.

At step 530 there is made a request to turn off hard disks, and perhaps to reduce CPU clocking speed or the number of multi-processor CPUs active, or other energy conserving changes as appropriate. Typically such control is handled by software that runs in SMM, if so it may be necessary to issue an SMI with an appropriate request block for the needed service.

In step 540, the VMs to be suspended are marked as having no share, or almost no share of available CPU time (and swapped-in virtual memory pages and/or so on).

And at step 599, Appliance execution is resumed by means of suitable exit/return code.

Figure 6A:
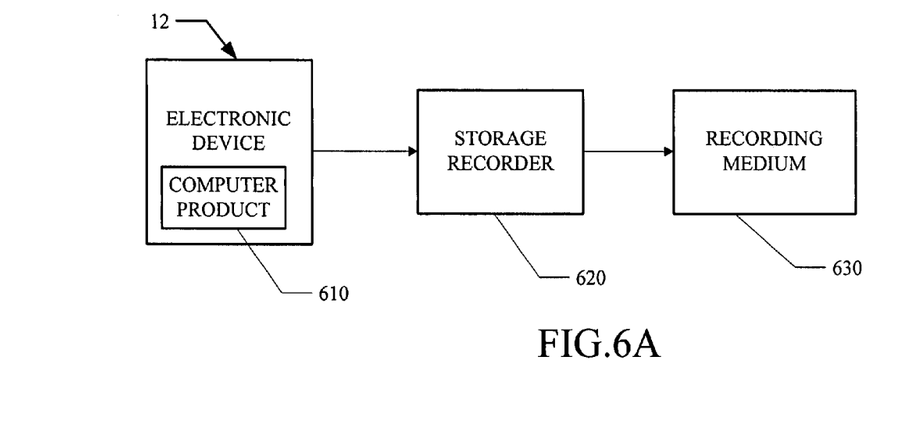
FIG. 6A shows how an exemplary embodiment of the invention may be encoded onto a computer medium or media.

With regards to FIG. 6A, computer instructions in an electronic device 12 may be distributed as manufactured firmware and/or software computer products 610 using a variety of possible media 630 having the instructions recorded thereon using a storage recorder 620. Often in products as complex as those that deploy the invention, more than one medium may be used, both in distribution and in manufacturing relevant product. Only one medium is shown in FIG. 6A for clarity but more than one medium may be used and a single computer product may be divided among a plurality of media.

Figure 6B:
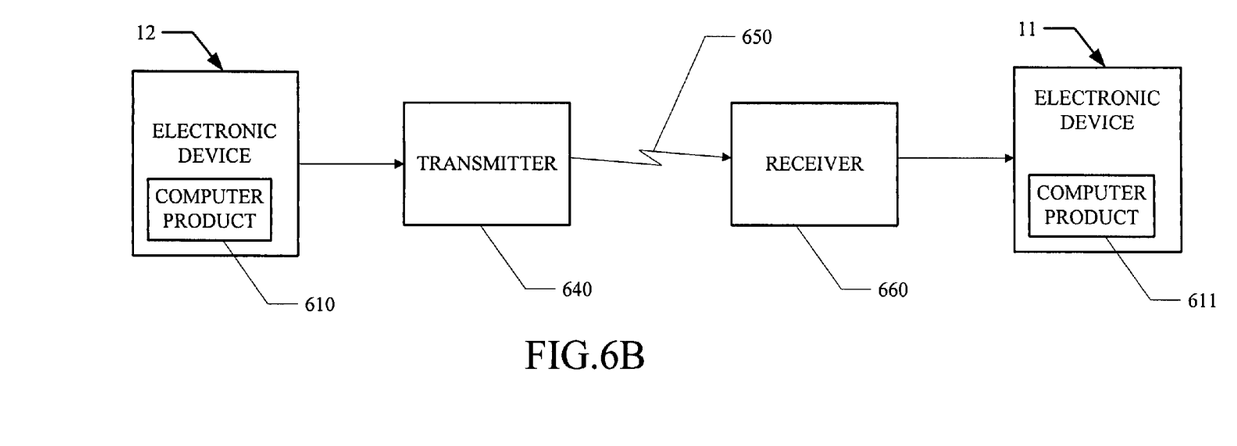
FIG. 6B shows how an exemplary embodiment of the invention may be encoded, transmitted, received and decoded using electromagnetic waves.

With regard to FIG. 6B, additionally, and especially since the rise in Internet usage, computer products 610 may be distributed by encoding them into signals modulated as a wave. The resulting waveforms may then be transmitted by a transmitter 640, propagated as modulated electro-magnetic carrier waves 650 and received by a receiver 660. Upon reception they may be demodulated and the signal decoded into a further version or copy of the computer product 611 in a memory or storage device 11.

Other topologies devices could also be used to construct alternative embodiments of the invention.

The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for initializing a computer for support of virtual machines comprising:
    allocating a first region of read-write memory;
    loading a hypervisor program from a first non-volatile memory into the first region, wherein an appliance is stored in the first non-volatile memory or a different non-volatile memory;
    creating a memory heap of the read-write memory, the memory heap excluding the first region;
    partitioning the memory heap to create a plurality of partitions responsive to parameters known to a BIOS program within the computer, wherein the plurality of partitions are dedicated to the corresponding virtual machines; and
    setting up, by the hypervisor program, the virtual machines using the plurality of partitions, wherein:
        the virtual machines are suspended in response to a request to switch the computer into a low-power state, and
        the appliance is executed during the low-power state while the virtual machines are suspended.

2. The method of claim 1 wherein:
    the allocating and the loading operate in a CPU (Central Processor Unit) real mode; and
    the hypervisor program operates at least partly in a mode selected from the group consisting of:
    a protected mode and
    a virtual memory mode.

3. The method of claim 1 further comprising:
    responsive to an action of the hypervisor program, executing a second program that is either contained within a MBR (Master Boot Record) or located using the MBR, wherein the MBR resides on a second non-volatile memory.

4. The method of claim 1 further comprising:
    making the first region invisible to programs loaded into the computer later than the hypervisor program.

5. The method of claim 1 further comprising:
    making the first region invisible to memory location queries from instructions that are located within the memory heap.

6. The method of claim 1 wherein the hypervisor program:
    creates a first environment for a first of the virtual machines;
    allocates to the first virtual machine a partition selected from the plurality of partitions and
    virtualizes a request from the first virtual machine.

7. A manufactured computer program product comprising:
at least one non-transitory computer-readable medium having computer instructions encoded therein, the instructions when executed by at least one computer cause said at least one computer to:
allocate a first region of read-write memory;
load a hypervisor program from a first non-volatile memory into the first region, wherein an appliance is stored in the first non-volatile memory or a different non-volatile memory;
create a memory heap of the read-write memory, the memory heap excluding the first region;
partition the memory heap into a plurality of partitions using BIOS configuration information, wherein the plurality of partitions are dedicated to corresponding virtual machines; and
set up, by the hypervisor program, the virtual machines using the plurality of partitions, wherein:
the virtual machines are suspended in response to a request to switch the computer into a low-power state, and
the appliance is executed during the low-power state while the virtual machines are SUS ended.

8. An electronic device comprising:
at least one controller or CPU (central processor unit); and
a plurality of non-volatile memories having computer instructions encoded therein, the instructions when executed by the controller or CPU cause said controller or CPU to:
allocate a first region of read-write memory;
load a hypervisor program from a first non-volatile memory into the first region, wherein an appliance is stored in the first non-volatile memory or a different non-volatile memory;
create a memory heap of the read-write memory, the memory heap excluding the first region;
partition the memory heap into a plurality of partitions using BIOS configuration information, wherein the plurality of partitions are dedicated to corresponding virtual machines; and
set up, by the hypervisor program, the virtual machines using the plurality of partitions, wherein:
the virtual machines are suspended in response to a request to switch the computer into a low-power state, and
the appliance is executed during the low-power state while the virtual machines are suspended.

9. The method of claim 1, wherein the memory heap constitutes free memory space useable by operating systems and programs loaded by the operating systems.

10. The electronic device of claim 8, wherein the memory heap constitutes free memory space useable by operating systems and programs loaded by the operating systems.

* * * * *